(No Model.)

C. C. NAGLEY.
SHEARS.

No. 489,612.        Patented Jan. 10, 1893.

WITNESSES:
C. L. Binderow
H. M. Seamans

INVENTOR:
Charles C. Nagley
By Duell, Laass & Duell
his ATTORNEYS.

UNITED STATES PATENT OFFICE.

CHARLES C. NAGLEY, OF MEMPHIS, NEW YORK.

SHEARS.

SPECIFICATION forming part of Letters Patent No. 489,612, dated January 10, 1893.

Application filed September 24, 1892. Serial No. 446,769. (No model.)

*To all whom it may concern:*

Be it known that I, CHARLES C. NAGLEY, of Memphis, in the county of Onondaga, in the State of New York, have invented new and useful Improvements in Tobacco-Shears, of which the following, taken in connection with the accompanying drawings, is a full, clear, and exact description.

This invention relates to the class of shears which are used for cutting tobacco stalks in the field. Such shears usually have their blades pivotally connected to each other by means of a bolt passing through the same and provided with a nut by which to tighten the blades. Said nut, however, is liable to be worked loose by its frictional contact with the adjacent blade when the shears are operated, and it causes much annoyance and loss of time to the operator to tighten the nut.

The object of this invention is to obviate this defect without impairing the efficiency of the shears. And to that end the invention consists in the combination, with the blades, bolt and nut, of a nut-lock consisting of two washers interposed respectively between the head of the bolt and adjacent blade, and between the nut and blade adjacent thereto, and a loop extending laterally from the washers and uniting the same, said loop being formed of a narrow bar to prevent the clogging of the loop as hereinafter more fully described and specifically set forth in the claim.

Figure 1:
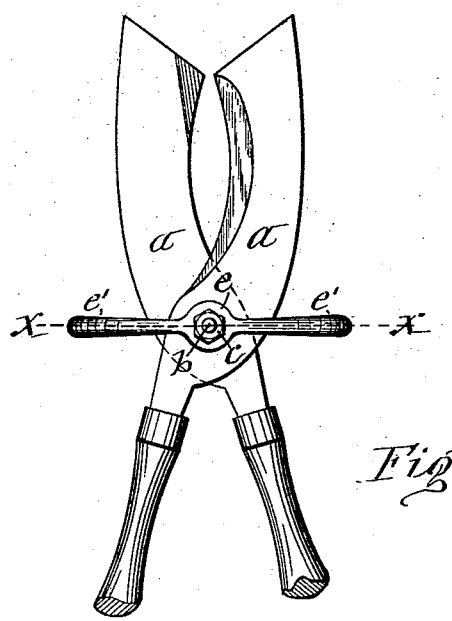
Figure 2:
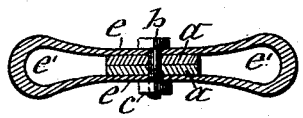
Figure 4:
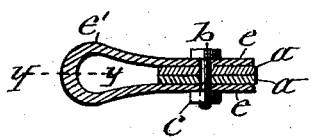
Figure 3:
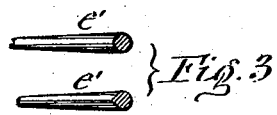
Figure 5:
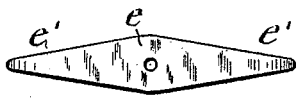

In the annexed drawings Figure 1 is a plan view of tobacco shears provided with my improved nut-lock, Fig. 2 is a transverse section on line $x$, $x$, in Fig. 1, Fig. 3 shows the transverse sectional shapes of the loop which unites the nut-lock washers when taken in a plane along the line $y$, $y$, in Fig. 4, Fig. 4 is a transverse section of a modification of my invention, and Fig. 5 is a plan view of a further modification of my invention.

Similar letters of reference indicate corresponding parts.

*a—a—* represent the two blades of the shears which may be of any suitable shape adapted for cutting tobacco stalks.

*b—* denotes the bolt by which the blades are pivotally connected to each other, and *—c—* is the nut by which the blades are tightened when required. To prevent said nut from working loose when the shears are operated I employ my improved nut-lock which consists of the two washers *—e—e—* one of which is interposed between the head of the bolt and adjacent blade, and the other is interposed between the nut *—c—* and blade *—a—* adjacent thereto. These washers are united by a loop *—e'—* formed in one piece therewith and extending laterally from the washers a sufficient distance to allow ample play for the blades inside of the loop. By thus tying the two washers to each other neither of them can turn without the other and consequently the head and nut of the bolt are confined in their position in relation to each other.

To guard against the clogging of the loop by earth or other material entering the loop during the operation of the shears, I form the loop of a bar which is narrowed as shown in either Fig. 1 or Fig. 5 of the drawings, and may be rounded or beveled on its inner side as shown in Fig. 3 of the drawings.

What I claim is:

The combination, with the blades *—a—a—*, bolt *—b—* and nut *—c—*, of a nut-lock consisting of two washers interposed respectively between the head of the bolt and adjacent blade, and between the nut and blade adjacent thereto, and a loop extending laterally from the washers and formed in one piece therewith and narrower than the washers to prevent clogging as set forth.

In testimony whereof I have hereunto signed my name this 1st day of August, 1892.

CHARLES C. NAGLEY. [L. S.]

Witnesses:
 I. R. BURCH,
 F. G. NAGLEY.